United States Patent [19]

Simpkin

[11] Patent Number: 5,896,895
[45] Date of Patent: Apr. 27, 1999

[54] RADIATION CONVECTION AND CONDUCTION HEAT FLOW INSULATION BARRIERS

[75] Inventor: William E. Simpkin, Dallas, Tex.

[73] Assignee: Lockheed Vought Systems, Houston, Tex.

[21] Appl. No.: 08/407,437

[22] Filed: Mar. 17, 1995

Related U.S. Application Data

[62] Division of application No. 08/106,930, Aug. 16, 1993, Pat. No. 5,431,016.

[51] Int. Cl.$^6$ ............................................. F16L 9/14
[52] U.S. Cl. .................... 138/149; 138/140; 138/113; 138/114; 138/143; 138/148
[58] Field of Search ........................ 138/149, 111–114, 138/137, 138, 140, 141, 143, 148; 62/555

[56] References Cited

U.S. PATENT DOCUMENTS

| | | | |
|---|---|---|---|
| 229,620 | 7/1880 | Lynch | 138/149 X |
| 340,691 | 4/1886 | Aldrich | 138/149 X |
| 394,398 | 12/1888 | Riley | 138/149 X |
| 616,127 | 12/1898 | Mergenthaler | 138/149 |
| 2,707,493 | 5/1955 | Bonvillian et al. | 138/149 X |
| 3,043,763 | 7/1962 | Spillmann | 204/193.2 |
| 3,044,499 | 7/1962 | Frerich | 138/149 X |
| 3,155,117 | 11/1964 | Spillmann | 138/149 |
| 3,307,350 | 3/1967 | Squires | 60/39.05 |
| 3,346,016 | 10/1967 | Blau et al. | 138/138 |
| 3,388,724 | 6/1968 | Mowell et al. | 138/149 |
| 3,595,275 | 7/1971 | Steans | 138/149 X |
| 3,715,265 | 2/1973 | Allen et al. | 138/148 X |
| 3,788,066 | 1/1974 | Nebgen | 60/39.05 |
| 3,978,661 | 9/1976 | Cheng | 60/39.55 |
| 4,014,369 | 3/1977 | Kobres, Jr. | 138/149 X |
| 4,067,189 | 1/1978 | Earnest | 60/39.18 |
| 4,128,994 | 12/1978 | Cheng | 60/39.05 |
| 4,133,171 | 1/1979 | Earnest et al. | 60/39.18 |
| 4,166,361 | 9/1979 | Earnest et al. | 60/39.18 |
| 4,178,754 | 12/1979 | Earnest | 60/39.03 |

(List continued on next page.)

OTHER PUBLICATIONS

Scheirer et al.; "The Combustion Turbine: Future Design and Fuel Flexibility"; pp. 324–334; vol. 43, Proceedings of the American Power Conference, 1981; place of publication unknown.

El–Wakil; "A Combined Cycle for Nuclear Powerplants"; pp. 350–351; Powerplant Technology; place of publication unknown.

Guffey, C.; "New Systems Save Gas Plant Energy"; p. 117; Aug. 3, 1981; 1981 Oil & Gas Journal (Abstract); place of publication unknown.

Garrett; "Garrett Run Carbon/carbon Turbine Rotor At 3000° F."; p. 310; Feb. 26, 1992; vol. 161, No. 39; Aerospace Daily (Abstract); place of publication unknown.

Garrett; "Garrett Run Carbon/carbon Turbine Rotor"; p. 2; Mar. 5, 1982 vol. 3, No. 5; Aerospace Propulsion (Abstract); place of publication unknown.

"Near–Commercial High–Temperature Materials II: Gamma Titanium Aluminides Provide Revolutionary Mix of Modulus, Operating Range, and Density"; P 5; Mar. 1993; vol. 10, No. 3; High–Tech Materials Alert (Abstract); place of publication unknown.

"Gas Turbines"; p. 40; May 1993; vol. 137, No. 5; Power (Abstract); place of publication unknown.

*Primary Examiner*—Patrick F. Brinson
*Attorney, Agent, or Firm*—Arnold, White & Durkee

[57] ABSTRACT

A system for shielding an interior metal surface of a metal container from a hot fluid within the metal container wherein the hot fluid is at a temperature greater than a temperature limit of the metal, including a first insulating layer including metal clad insulation proximate the interior metal surface, a second insulating layer spaced from the first insulating layer including a perforated reflective metal shield and a third insulating layer spaced from the second insulating layer which is structurally stable and substantially inert to the hot fluid.

7 Claims, 4 Drawing Sheets

U.S. PATENT DOCUMENTS

| | | | |
|---|---|---|---|
| 4,204,401 | 5/1980 | Earnest | 60/39.03 |
| 4,233,816 | 11/1980 | Hensley | 62/55 |
| 4,248,039 | 2/1981 | Cheng | 60/39.05 |
| 4,271,664 | 6/1981 | Earnest | 60/39.18 |
| 4,297,841 | 11/1981 | Cheng | 60/39.3 |
| 4,417,438 | 11/1983 | Cheng | 60/39.05 |
| 4,499,721 | 2/1985 | Cheng | 60/39.05 |
| 4,637,212 | 1/1987 | Auget | 60/655 |
| 4,648,802 | 3/1987 | Mack | 416/244 A |
| 4,966,201 | 10/1990 | Svec et al. | 138/141 |
| 4,986,943 | 1/1991 | Sheaffer et al. | 264/29.1 |
| 5,009,823 | 4/1991 | Kromrey | 264/29.7 |
| 5,021,107 | 6/1991 | Holko | 156/89 |
| 5,047,264 | 9/1991 | Draskovich | 427/277 |
| 5,052,463 | 10/1991 | Lechner et al. | 164/35 |
| 5,091,164 | 2/1992 | Takabatake | 423/445 |
| 5,100,049 | 3/1992 | Divecha et al. | 228/198 |
| 5,114,635 | 5/1992 | Sohda et al. | 264/29.2 |
| 5,127,783 | 7/1992 | Moghe et al. | 411/411 |
| 5,147,588 | 9/1992 | Okura et al. | 264/29.7 |
| 5,151,325 | 9/1992 | Draskovich | 428/325 |
| 5,181,844 | 1/1993 | Bishop et al. | 418/152 |
| 5,192,471 | 3/1993 | Uemura et al. | 264/29.5 |
| 5,205,716 | 4/1993 | Georges et al. | 416/229 |
| 5,207,972 | 5/1993 | Hemsath | 266/44 |
| 5,217,657 | 6/1993 | Engle | 264/29.5 |
| 5,241,825 | 9/1993 | Collin et al. | 60/655 |

RADIATION CONVECTION AND CONDUCTION HEAT FLOW INSULATION BARRIERS

This application is a divisional of application Ser. No. 08/106,930, filed Aug. 16, 1993, now U.S. Pat. No. 5,431,016.

BACKGROUND OF THE INVENTION

A. Field of the Invention

This invention relates to central-station power-generation systems and, more particularly, to a combined Rankine/Brayton heat engine cycle.

B. Description of the Related Art

The Rankine-cycle, typified by a conventional steam engine, minimizes compression work by capitalizing on the energy exchange involved when a liquid changes to a vapor. Although Rankine-cycles can have higher thermal efficiency than other cycles because pressuring water is simple and does not consume much energy, transferring heat to the steam poses a problem. The necessity of using high-temperature, boiler-tube materials capable of containing the high-pressure working fluid limits the maximum possible superheated-steam temperatures to less than 1300° F. Efforts to maximize the thermal efficiency of power plants employing a Rankine-cycle have plateaued at an efficiency of approximately 40%.

The Brayton-cycle, typified by a conventional gas-turbine engine, ideally consists of two constant-pressure (isobaric) processes and two adiabatic-reversible (isentropic) processes. In actuality, irreversible losses occur; therefore, no engine is capable of wholly isobaric or isentropic processes. In an ideal Brayton-cycle system, gas is compressed isentropically, heated at constant pressure, and then expanded isentropically through a turbine. In an open-loop Brayton-cycle system, cooling occurs in the open atmosphere. In a closed-loop Brayton-cycle system, cooling occurs in a heat exchanger.

In a Brayton-cycle system, the fuel consumes less than 100% of the air's oxygen content. This is because part of the air must be used for cooling, so that heat limits of the engine's materials are not exceeded. Present state-of-the-art metallic materials have heat limits of about 1800° F. Present state-of-the-art ceramic materials have heat limits of about 2300° F. Recently, carbon-carbon materials have been considered for use in Brayton-cycle, due to the ability of the carbon-carbon to retain tensile strength at high temperatures. A carbon-carbon turbine rotor, for example, was tested at temperatures of approximately 2800° F. at 30,000 revolutions per minute in a stoichiometric-fueled turbojet-engine, as discussed in "LTV, Garrett Run Carbon/Carbon Turbine Rotor," *Aerospace Propulsion*, vol. 3, no. 5, p. 2 (Mar. 5, 1992) and in "LTV, Garrett Run Carbon/Carbon Turbine Rotor at 3000° F.," *Aerospace Daily*, vol. 161, no. 39, p. 310 (Feb. 26, 1992).

A combination of the Brayton-cycle and the Rankine-cycle in series has been proposed to recover waste heat from the single Brayton-cycle system. This combined-cycle system uses the Brayton-cycle exhaust heat to heat the Rankine-cycle water/steam. Thus, the heat rejection of the overall system is from the Rankine-cycle and can be close to ambient temperature. In an integrated, combined-cycle system, part or all of the shaft power necessary to drive the Brayton-cycle compressor is supplied by the Rankine-cycle turbine. Combined-Brayton-Rankine-cycle systems produce higher efficiency than either system alone. However, these systems are complex since they essentially combine two thermodynamic heat engines into one powerplant system.

A combined Brayton-Rankine-cycle for a high temperature gas-cooled nuclear reactor is discussed in Powerplant Technology, by M. M. El-Wakil, on pages 350 and 351. In this system, the closed-loop Brayton-cycle is coupled to the Rankine-cycle via a feed-water heater. In the Brayton-cycle, helium is compressed in a helium compressor. The compressed helium is preheated in a regenerator then enters the high-temperature, gas-cooled nuclear reactor and emerges at a higher temperature. The helium then expands in a helium turbine and enters a regenerator. Remaining energy is transferred to the Rankine-cycle via a closed-type steam feedwater heater. The helium reenters the helium compressor.

SUMMARY OF THE INVENTION

The present invention provides a unique integration and arrangement of mechanical components for a combined cycle central-station power-generation system resulting in increased efficiency.

The present invention employs a closed-loop Brayton-cycle topping system. The topping system's working fluid is an inert gas, such as helium, argon or neon. The inert gas working fluid enables use of mechanical components made with heat resistant materials which are capable of retaining their strength at temperatures in excess of 2500° F. but are subject to oxidation or material degradation due to surface attack.

High-temperature-resistant mechanical components include a topping system turbine expander, and in some cases, e.g., nuclear heating, a topping system heat exchanger and a pipe connecting the topping system heat exchanger to the topping system turbine expander.

In accordance with another feature of the invention, a conventional closed-loop steam Rankine-cycle is used as a base system for the Brayton-cycle topping system. The topping system and the base system are interconnected such that the topping system exhaust provides heat energy input to the base system. The topping system operates at maximum temperatures greatly in excess of the base system's maximum temperatures. Consequently, significant thermal energy to mechanical energy conversion can occur with exhaust energy hot enough to make steam. Apportionment of energy input to the topping system and the base system depends on the topping system pressure ratio and maximum temperature. For example, if the topping system's firebox/boiler has maximum temperature on the order of 2300° F., and the base system operates at typical superheated steam pressure and temperature, the majority of the firebox energy, ie., 60% to 80%, typically would be absorbed by the boiler superheater of the Rankine-cycle base system. On the other hand, if the topping system's maximum temperature is on the order of 4000° F. and the base system operates at typical superheated steam pressure and temperature, all of the heat energy input typically would be to the topping system. Consequently, energy transferred to the topping system either becomes mechanical work energy output or is rejected as base-system input.

The high-temperature-resistant materials used in construction of certain topping system mechanical components retain their strength at temperatures where metal exhibits creep, i.e., deformation, redistribution of stresses and ultimately structural failure. Creep results from high stress at high temperature. Creep can cause problems such as deformation and redistribution of stresses such that encased rotating mechanical components rub against casing walls.

To prevent creep, the present invention employs a system of radiation shielding, shielding cooling, and internal insulation that enables conventional steel pressure vessels to be used for piping that contains the high-temperature, inert gas working fluid and connects the topping system "fire box", i.e., fuel-burning unit or nuclear reacting unit, and the topping system turbine expander inlet. The same shielding-cooling-insulating system can be used for the casing of the topping system turbine expander. The design parameters of the shielding-cooling-insulating system depend on the inert gas working fluid's operating temperature and pressure.

The present invention increases efficiency of existing fossil-fueled steam generation power plants by providing a topping system capable of producing significant power output, and discharging exhaust having energy usable in the steam turbine system. When a steam generation power plant undergoes firebox/boiler renovation, the topping system heat exchanger of the present invention can be added to the firebox. The steam system is basically unchanged from conventional practice except a significant portion of the water heating and steam generation occur in the topping system heat exchanger. This modification results in the above-described dual-system configuration. After the modification, the base system differs from the existing steam turbine system in that a significant portion of the total heat energy input goes to the topping system, and water heating and steam generating occur in the topping system's heat exchanger as well as in the firebox/boiler. The net effect of the Brayton-cycle energy transfer to the Rankine-cycle is that part of the flow from the water pressurization pump would enter the steam header as high temperature water and/or steam.

In accordance with a further aspect of the present invention, a conventional steam power plant firebox/boiler is retrofitted for producing a flow of high temperature inert gas. This retrofitted firebox/boiler incorporates ceramic heat exchanger elements.

In a preferred embodiment of the invention using a conventional closed-loop Rankine base system, all load response is accomplished using conventional steam power plant system controls. Additionally, this dual-system configuration increases efficiency of existing steam generation power plants operating at part-load conditions over efficiency of existing steam generation power plants operating at full-load capacity by reapportioning heat energy inputs to the topping system and the base system. During part-load operation, a steam generating power plant has a reduced load. Reduced-load operation requires less heat energy input than does full-load operation. Reapportionment is effected by a firebox/combustor capable of effectively increasing heat energy input to the topping system relative to heat energy input to the base system. Reapportionment results in an approximately constant topping system heat energy input and in a reduced base system heat energy input. Such reapportionment of the topping system heat energy input and the base system heat energy input increases the efficiency of a steam generating power plant operating at part-load.

BRIEF DESCRIPTION OF THE DRAWINGS

The invention may take physical form in certain parts and arrangements of parts, a preferred embodiment of which will be described in detail and illustrated in the accompanying drawings which form a part hereof and wherein.

DETAILED DESCRIPTION OF THE PREFERRED EMBODIMENT

To provide a more complete presentation of this invention, and of its major components, reference is made to the accompanying drawings wherein the showings are for the purpose of illustrating a preferred embodiment of the present invention only and not for the purposes of limiting the same.

Figure 1:
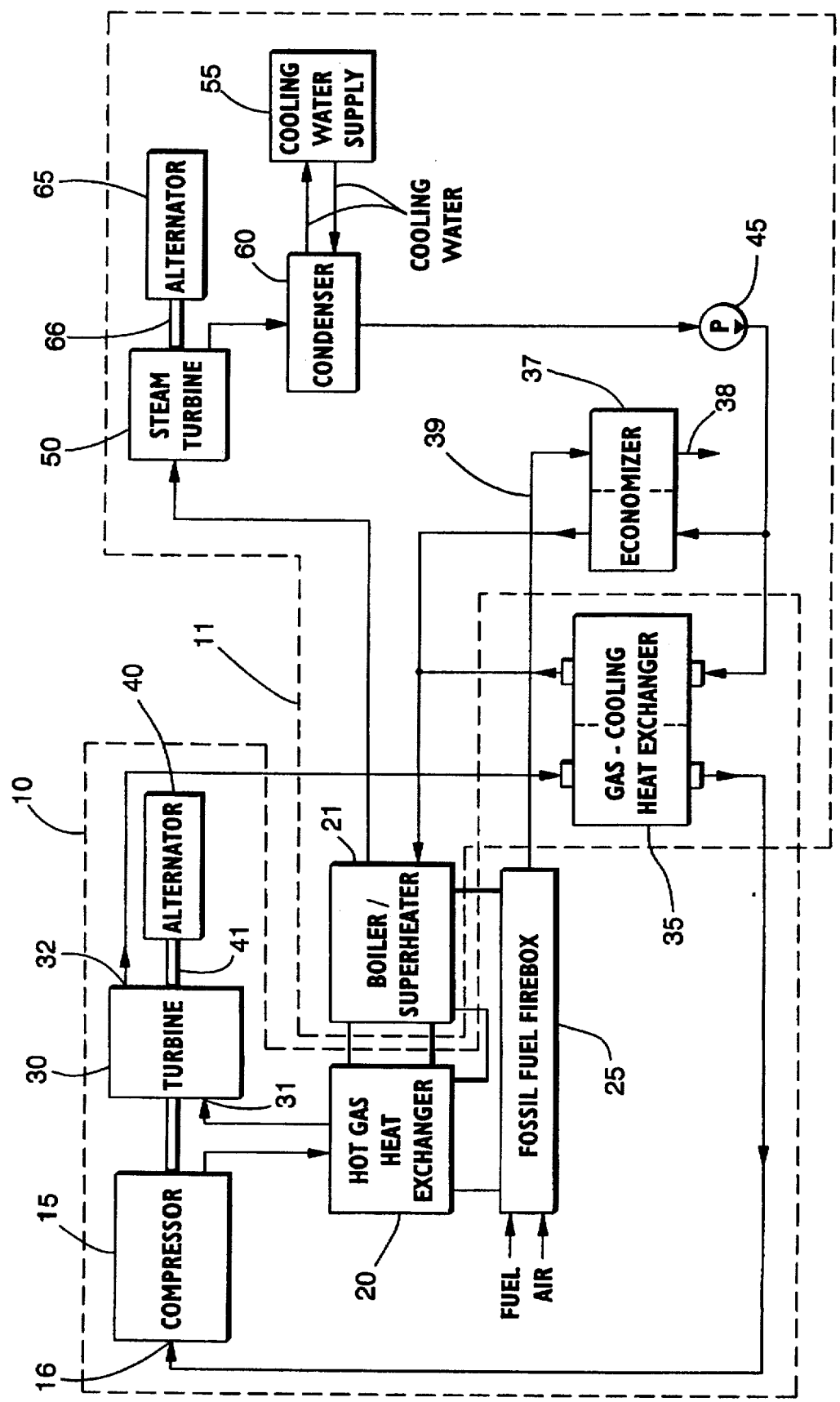
FIG. 1 is a block diagram of the dual-system configuration of the present invention using a fossil fuel-burning closed-loop Brayton-cycle topping system and a conventional closed-loop steam Rankine-cycle base system.

FIG. 1 schematically illustrates a dual-system configuration using a fossil-fuel-burning closed-loop Brayton-cycle topping system 10 and a conventional closed-loop steam Rankine-cycle system 11.

A dual-system configuration has potential for high efficiency power generation. A closed-loop Brayton-cycle having a maximum temperature of anywhere between about 2200° F. to about 2500° F. can produce significant power output and reject waste heat at temperatures high enough that the waste heat can be fully utilized in powering a closed-loop Rankine-cycle steam power system. Closed-loop Rankine-cycle steam system operating parameters are considered fixed for the purposes of dual-system configuration system evaluation and comparison purposes. This dual-system configuration can develop an increase in efficiency (overall combined power output to fuel-burned input) in the range of 10% to 25% over the closed-loop Rankine-cycle steam system alone. Additionally, power output of dual-system configuration system increases by 15% to 25% for an increase in fuel burned of 5% to 7%. Specific performance values can be optimized by systematically varying closed-loop Brayton-cycle parameters, such as pressure ratio, maximum cycle temperature, and component efficiencies and pressure loss fractions in the heat exchangers. Since at partial power, or off-design point operations, inert gas working fluid flow rate and operating pressures and temperatures will tend to be constant, closed-loop Brayton-cycle output will be nearly constant due to constant speed. Thus, overall plant efficiency will tend to be higher than at the design point.

Development of a material with usable strength and life that can withstand a firebox environment at temperatures above 2500° F. is a key enabler for higher efficiency fossil-fueled systems. Silicon carbide fiber distributed in a aluminum oxide matrix has demonstrated these properties. Although its strength is adequate for firebox heat exchanger tubes, silicon carbide fiber distributed in a aluminum oxide matrix is not adequate for loads incurred in a turbine rotor of practical power plant size. Carbon-carbon has much greater strength even at much higher temperatures and is light weight. This combination of properties would enable a high temperature turbine. However, carbon-carbon must be protected from oxidation at high temperatures. In turbojets, a silicon carbide or variants coating is used to protect the base material. However, the coatings have a short life relative to power plant usage. Therefore, it is preferred to use an inert gas working fluid to create a non-oxidizing environment. Argon, helium, or neon are suitable inert gases, having good aero-thermodynamic properties for a closed-loop Brayton-cycle operating at high maximum temperature.

In the preferred embodiment, an inert gas working fluid in a closed-loop Brayton-cycle with high strength/high temperature carbon-carbon and/or ceramic components is heated to temperatures such that significant mechanical power could be extracted, with turbine exhaust gas temperature sufficiently high to be suitable for transferring heat energy to produce steam in a boiler sub-system as a portion of a closed-loop Rankine-cycle steam system.

In the system of FIG. 1, both the closed-loop Brayton-cycle topping system 10 and the closed-loop Rankine-cycle base system 11 contain the dual-system configuration's working fluid during all normal operations. Maximum temperatures of topping system 10 are much higher than maximum temperatures of base system 11. The topping system 10 working fluid is an inert gas, such as helium, neon, or argon. Using an inert-gas working fluid enables the topping system 10 to use highly-loaded oxidation-sensitive material capable of retaining strength at high temperatures. Such oxidation-sensitive materials are subject to oxidation or material degradation from surface attack in oxidizing environments at high temperatures. For example, carbon-carbon composite retains very high strength per unit of mass to temperatures in excess of 5000° F. However, carbon-carbon slowly oxidizes in an oxidizing atmosphere at temperatures less than 1000° F. and goes into active oxidation in an oxidizing environment at temperatures greater than 3000° F.

The dual-system configuration of FIG. 1 efficiently converts thermal energy to mechanical energy. Nearly all of the energy put into the topping system 10 comes out either as mechanical energy or as thermal energy used to drive the base system 11.

Heat energy input to topping system 10 is relatively apportioned to heat energy input to base steam system 11. Such apportionment interdepends on maximum temperature and pressure ratio of topping system lo and the maximum operating pressure and temperature of boiler/superheater 21. For example, if maximum working fluid temperature of topping system 10 is near 2300° F. and operating temperature and pressure of base system 11 is that of high, superheated steam, a portion of the total heat energy for the dual-system configuration can be input to the topping system 10, but the overall efficiency of the topping system 10 and the base system is significantly increased.

In the schematic block diagram of FIG.1, the closed-loop Brayton-cycle topping system 10 consists of compressor 15, hot-gas heat exchanger 20, fossil fuel firebox 25, turbine expander 30, gas-cooling heat exchanger 35 and an electrical generator such as alternator 40.

In the schematic block diagram of FIG.1, the closed-loop Rankine-cycle base system 11 consists of water-pressurization pump 45, boiler side of gas-cooling heat exchanger 35, economizer 37, boiler/superheater 21, steam turbine expander 50, cooling water supply 55, condenser 60 and an electrical generator such as alternator 65.

The topping system 10 of FIG. 1 employs an inert gas working fluid which is compressed in compressor 15. Compressor 15 is designed and constructed like conventional large gas-turbine engines. Adiabatic compression that the inert gas working fluid undergoes results in increased pressure and increased temperature. In the topping system 10 of FIG. 1, the inert, pressurized working fluid leaving compressor 15 is heated in hot-gas heat exchanger 20. The inert, pressurized working fluid is heated to a temperature selected as optimum for the dual-system configuration in view of materials limitations and performance of topping system 10. More specifically, the inert, pressurized working fluid enters hot-gas heat exchanger 20 at a temperature anywhere between about 1400° F. to about 1500° F. and is heated to a temperature anywhere between about 2400° F. to about 2500° F. In the topping system 10 of FIG. 1, hot-gas heat exchanger 20 is fired from a source of combusted fossil fuel contained in firebox 25. The heated working fluid leaving hot-gas heat exchanger 20 is received by turbine expander 30 at high-temperature, high-pressure inlet 31. Turbine expander 30 is a conventional turbine expander and is configured with nozzle vanes to produce a properly directed, high-velocity gas flow for efficient use by turbine rotor blades. For a 100 MWe dual-system configuration utilizing an argon working fluid, for example, dual turbines having eight foot diameters could be used. The received heated working fluid drives a rotor in turbine expander 30 which in turn drives an electrical generator such as alternator 40 via a shaft 41. The turbine expander 30 uses a carbon-carbon turbine rotor which can be manufactured as described in U.S. Pat. Nos. 4,567,007 and 4,659,624 incorporated herein by reference. Alternator 40 produces electrical power output. Inert working fluid leaving turbine expander 30 via lower-temperature, lower-pressure outlet 32 is ducted to gas-cooling heat exchanger 35 for receiving and cooling the inert gas working fluid exhausted from the turbine expander 30 at outlet 32 by transferring heat energy from the inert gas working fluid to pressurized water flowing from water-pressurization pump 45 of the base system 11. The thermal energy transferred to the pressurized water either produces steam or heats the pressurized water or does both depending on design parameters dictated by the dual-system configuration of FIG. 1.

In the topping system 10 of FIG. 1, cooled working fluid from gas-cooling heat exchanger 35 is ducted back to compressor 15 and enters compressor 15 at compressor inlet 16.

In the dual-system configuration of FIG. 1, boiler/superheater 21 receives and further heats pressurized water leaving gas-cooling heat exchanger 35 and economizer 37. Boiler/superheater 21 is heated by transfer of heat from fuel combustion in firebox 25. The pressurized water by means of boiler/superheater 21 is thus boosted to a selected higher superheated steam temperature. In the base system 11 of FIG. 1, superheated steam leaving boiler/superheater 21 drives steam turbine expander 50. Steam turbine expander 50 is a conventional steam turbine expander and is configured with turbine nozzle vanes that accelerate and direct steam to turbine rotor blades. Turbine expander 50 drives an electrical generator such as alternator 65 via a shaft 66. Alternator 65 produces electrical power output.

In the base system 11 of FIG. 1, steam and water droplet mixture leaving steam turbine expander 50 is received by condenser 60 and condensed to produce water. In condenser 60, heat from the steam and water droplet mixture is transferred to cooling water 55. Water produced by condensation of steam and water droplet mixture at condenser 60 is received by water pressurization pump 45 and pressurized to boiler-operating pressure. Economizer 37 is connected to water-pressurization pump 45 and boiler/superheater 21 in parallel with gas-cooling heat exchanger 35. Economizer 37 receives and heats pressurized water from water-pressurization pump 45 to boiler-operating temperature. Economizer 37 is heated by exhaust gas 38 from the firebox 25. The exhaust gas 38 from firebox 25 is ducted to economizer 37 via pipes 39. The pressurized boiler-operating temperature water leaving economizer 37 and gas-cooling heat exchanger 35 is ducted to boiler/superheater 21.

Figure 2:
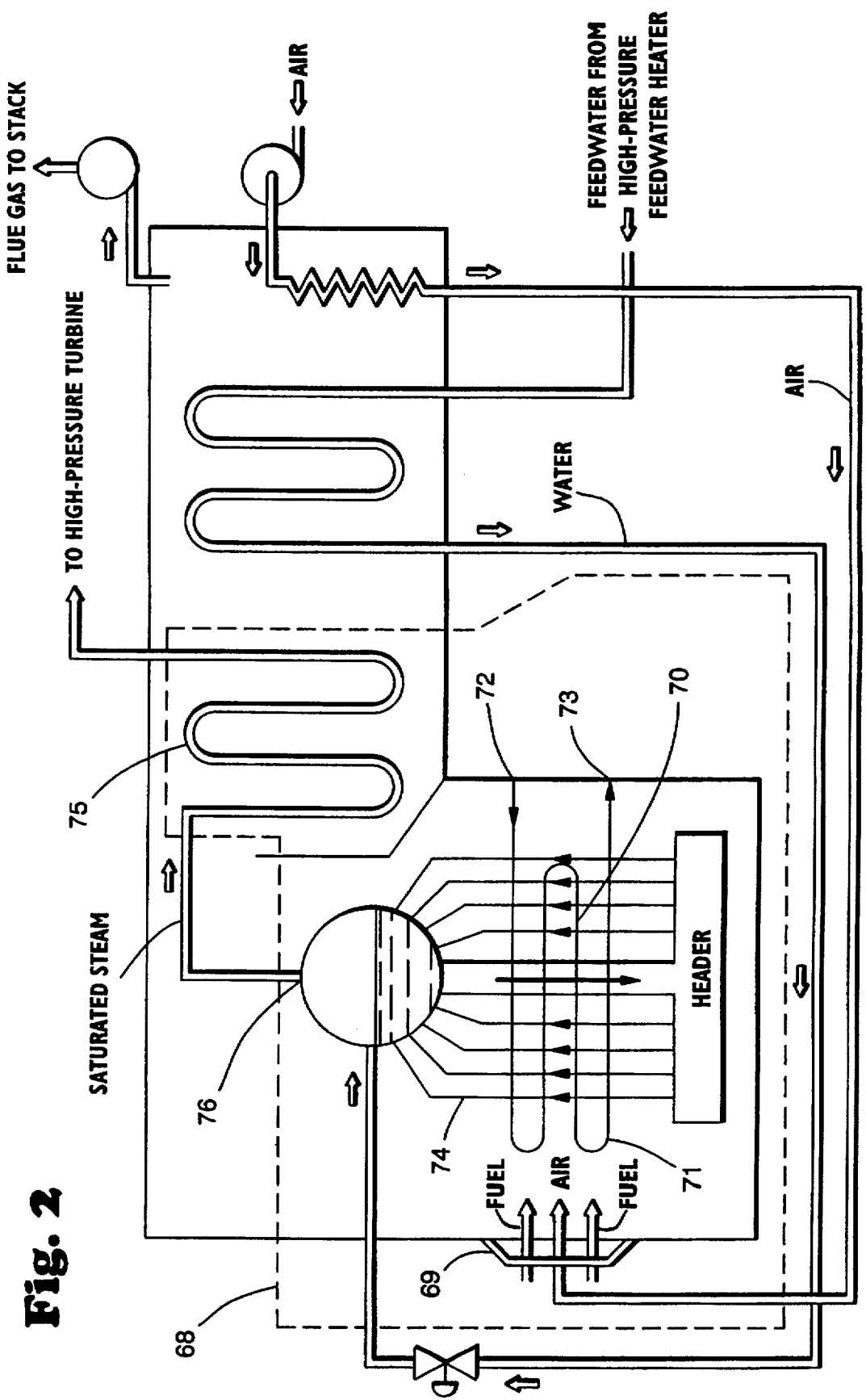
FIG. 2 is a schematic diagram of a multi-pass counterflow tube-type hot-gas heat exchanger installation in a boiler firebox.

The multi-pass counterflow tube-type hot-gas heat exchanger installation of FIG. 2 involves retrofitting a conventional large steam power plant firebox/boiler 68 having boiler tubes 74 to incorporate ceramic heat-exchanger elements 70. Firebox/boiler 68 contains boiler tubes 74 for generating steam. Saturated steam flows from boiler discharge header 76 to superheater 75 for temperature increase to maximum superheater steam operating temperature. Maximum combustion gas temperatures in the conventional large steam power plant firebox/boiler 68 are achieved in combustion region 69. Combustion region 69 produces combustion gases for heating boiler tubes 74. Placed in or in close proximity to combustion region 69, ceramic heat-exchanger elements 70 are heated by the combustion gases. Ceramic heat exchanger elements 70 are located centrally in combustion region 69 and are arranged to form multiple parallel tube loops 71 between inlet header 72 and discharge header 73. It is to be understood that in the preferred embodiment ceramic heat exchanger elements 70 can be constructed of DuPont Lanxide's DiMox™. For example, DiMox™ silica carbide particulate in aluminum oxide (SiC (p)/Al$_2$O$_3$) tubes having an outer diameter of 2.5 inches and an inner diameter of 2.0 inches can be used for heat exchanger elements 70.

Figure 3:
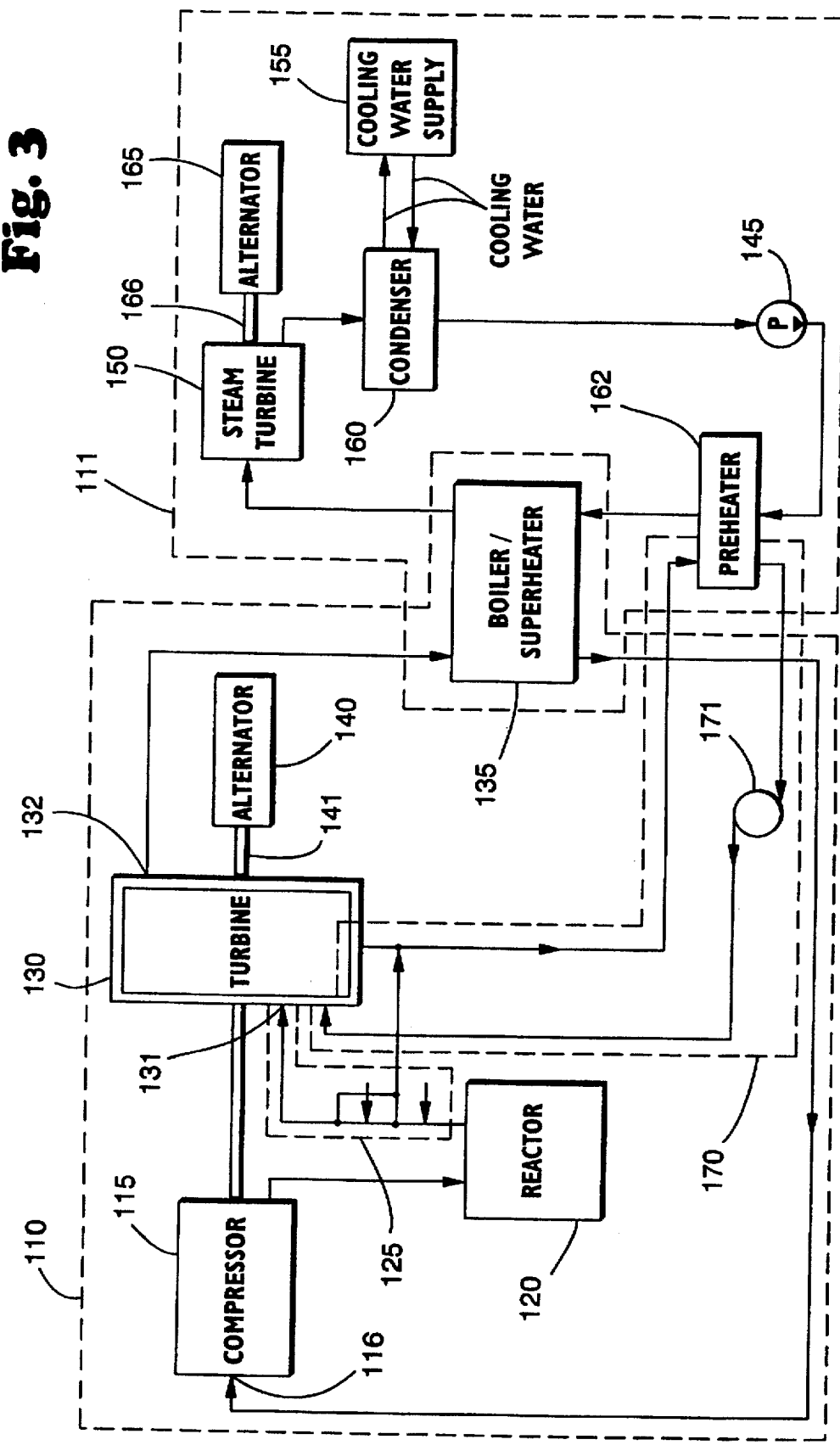
FIG. 3 is a block diagram of the dual-system configuration of this invention using a nuclear-powered closed-loop Brayton-cycle topping system and a conventional closed-loop steam Rankine-cycle base system.

FIG. 3 represents another preferred embodiment of the present invention. In FIG. 3, the dual-system configuration of this invention uses a nuclear-powered closed-loop Brayton-cycle configured as a topping system 110 and a conventional closed-loop Rankine-cycle steam system configured as a base system 111.

In the dual-system configuration of FIG. 3, all nuclear thermal energy input goes to inert gas working fluid of topping system 110. More specifically, if maximum temperature of the topping system 110 is near 4000° F. and operating temperature and pressure of base system 111 is that of high, superheated steam, the topping system 110 and the base system 111 can be configured so that all heat energy for the dual-system configuration can be input to the topping system 110, producing a very large increase in overall dual-system configuration efficiency.

In the schematic block diagram of FIG. 3, the closed-loop nuclear-powered Brayton-cycle topping system 110 consists of compressor 115, nuclear reactor 120, Hot Tubes™ shielding-cooling-insulating system high temperature piping 125, turbine expander 130, boiler/superheater 135 and an electrical generator such as alternator 140.

In the schematic block diagram of FIG.3, the closed-loop nuclear-powered Rankine-cycle base system 111 consists of water pressurization pump 145, boiler/superheater 135, steam turbine expander 150, cooling water supply 155, condenser 160, preheater 162 and an electrical generator such as alternator 165.

The topping system 110 is a closed-loop nuclear-powered Brayton-cycle with an inert gas working fluid. The topping system 110 is interconnected to the base system 111 via boiler/superheater 135 and preheater 162. An inert gas working fluid is ducted from nuclear reactor 120 to turbine expander 130 via the Hot Tubes™ shielding-cooling-insulating system high temperature piping 125. The same thermal control system is used for making a casing for turbine expander 130. Thus, enabling the use of a conventional steel turbine casing.

The closed-loop Brayton-cycle nuclear-powered system of FIG. 3 employs an inert gas working fluid which is compressed in compressor 115. Adiabatic compression that the inert gas working fluid undergoes results in increased pressure and increased temperature. In the topping system 110 of FIG. 3, the inert, pressurized working fluid leaving compressor 115 is heated in nuclear reactor 120. The inert, high-pressurized working fluid is heated to a temperature selected as optimum for the dual-system configuration in view of materials limitations and performance of topping system 110. More specifically, the inert pressurized working fluid enters nuclear reactor 120 at a temperature on the order of 1650° F. and is heated to a temperature on the order of 4000° F. The heated working fluid leaving nuclear reactor 120 is ducted via Hot Tubes™ shielding-cooling-insulating'system high temperature piping 125 and is received by turbine expander 130 at high-temperature, high-pressure inlet 131. The received heated working fluid drives a turbine rotor made of carbon-carbon material in turbine expander 130 which in turn drives an electrical generator such as alternator 140 via a shaft 141. The turbine expander 130 uses a carbon-carbon turbine rotor which can be manufactured as described in U.S. Pat. Nos. 4,567,007 and 4,659,624 incorporated herein by reference. Alternator 140 produces electrical power output. Inert working fluid leaving turbine expander 130 via lower-temperature, lower-pressure outlet 32 is ducted to boiler/superheater 135 for receiving and cooling the inert gas working fluid exhausted from turbine expander 130 at outlet 132 by transferring heat energy from the inert gas working fluid to pressurized water flowing from water-pressurization pump 145 of the base system 111. The thermal energy transferred to the pressurized water produces superheated steam.

In topping system 110 of FIG. 3, cooled inert gas working fluid from boiler/superheater 135 is ducted back to compressor 115 and enters compressor 115 at compressor inlet 116.

In the dual-system configuration of FIG. 3, superheated steam leaving boiler/superheater 135 drives steam turbine expander 150 which in turn drives an electrical generator such as alternator 165 via a shaft 166. Alternator 165 produces electrical power output.

In the base system 111 of FIG. 3, steam and water droplet mixture leaving steam turbine expander 150 is received by condenser 160 and condensed to produce water. In condenser 160, heat from the steam and water droplet mixture is transferred to cooling water 155. Water produced by condensation of steam and water droplet mixture at condenser 160 is received by water pressurization pump 145 and pressurized to boiler-operating pressure. Preheater 162 is connected to water-pressurization pump 145 and boiler/superheater 135. Preheater 162 receives and heats pressurized water from water-pressurization pump 145. Preheater 162 is heated by an inert gas contained in structural cooling loop 170. The heated pressurized water leaving preheater 162 is ducted to boiler/superheater 135.

Figure 4:
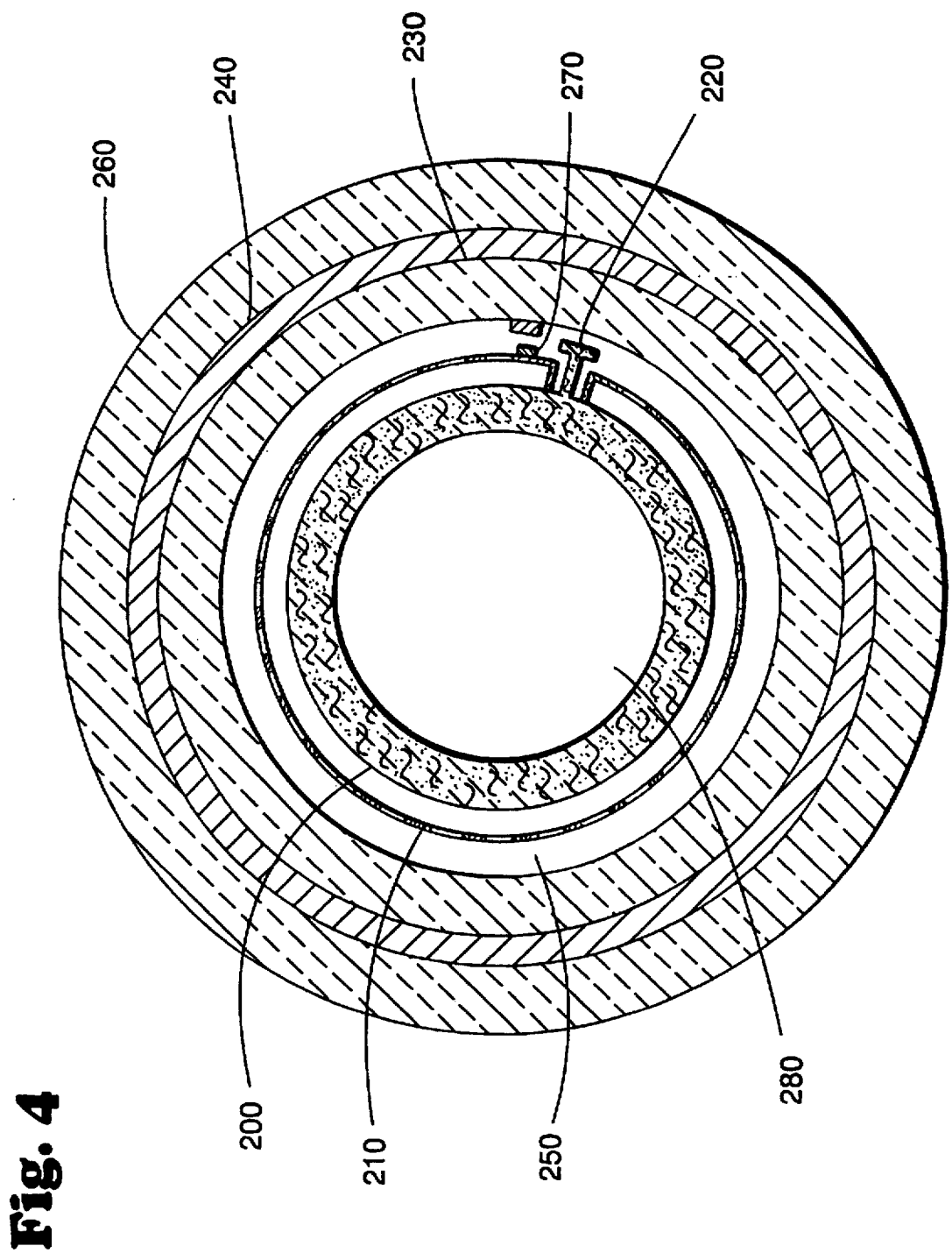
FIG. 4 is a cross-sectional view of the shielding-cooling-insulating system of the present invention taken through its center.

FIG. 4 illustrates the shielding-cooling-insulating system of the present invention used for Hot Tubes™ high-temperature piping, ducting, and/or pressure vessels. The shielding-cooling-insulating system of FIG. 4 enables containment of very high temperature working fluids with conventional metal structures. Design and construction of Hot Tubes™ high temperature piping having the shielding-cooling-insulating system of FIG. 4 enables use of conventional materials and designs for a container used to transfer and/or process fluids (gases or liquids) having a temperature that exceeds the temperature limits of materials conventionally used for such piping, ducting, or pressure vessels.

The shielding-cooling-insulating system facilitates use of conventional steel pressure-vessel design for the connecting piping between hot-gas-heat-exchanger firebox tubes and turbine expander inlets. In addition to piping, the design principles of high-temperature Hot Tubes™ shielding-cooling-insulating system can be used for other vessels such as a turbine case. FIG. 4 conceptually represents such a pressure vessel. The extent of shielding-cooling-insulating system provided by a circulating structural cooling loop is a design variable that depends on the inert gas working fluid's operating temperature and on pressure-vessel design optimization. The shielding-cooling-insulating system's working medium gas would be the same gas species as the inert-gas working fluid. Such pressure-vessel structural cooling loop would consist of a heat exchanger, either air-cooled or water-cooled, a circulating fan, an inert-gas source, and pressure controls for approximately pressure balancing the structured cooling loop's working medium gas with the inert-gas working fluid. Although energy transferred in the shielding-cooling-insulating system is small relative to the inert-gas working fluid's energy flow, such energy could be used either in combustion-air preheating, in the case of an air-cooled heat exchanger within the structural cooling loop, or in water preheating in the base system, in the case of a water cooled hot gas heat exchanger within the structural cooling loop.

In the preferred embodiment, very high temperature inert gas working fluid is in direct contact with carbon-carbon. Although carbon-carbon retains strength at high temperatures, in an oxidizing environment, it is subject to oxidation at temperatures as low as 800° F. Oxidation can destroy carbon-carbon at significantly higher temperatures. Although carbon-carbon has been used in many structural applications and has structural properties suitable for very high temperature piping, ducting, and pressure vessels, two characteristics of carbon-carbon limit its suitability for use in the Hot Tubes™ shielding-cooling-insulating system. As discussed above, carbon-carbon must be protected from oxidation either with surface coatings that provide a barrier to oxidants, or, as in the case of this embodiment, the use of an inert gas working fluid. However, although an inert gas working fluid/carbon-carbon mechanical component design is satisfactory for device interiors, device exteriors must also be protected from oxidation. Very long-life-oxidation-barrier coatings are not currently available. Thus, although a carbon-carbon channel of this embodiment has a stable interior, the exterior must be protected from atmospheric exposure. Additionally, carbon-carbon can be made into an exceptionally strong structure; however, carbon-carbon does not prevent gas migration. That is, at high pressures, the pressurant, i.e., the material having the higher pressure, will very slowly seep through any carbon-carbon walls.

Additionally, use of very high-temperature working fluids requires heat flow insulation barriers to prevent heat from dissipating to surroundings. However, heat flow insulation barriers must maintain pressure vessel temperatures within acceptable limits while providing a low overall release of energy to the environment by having a low exterior temperature.

The Hot Tubes™ radiation-convection-conduction system minimizes heat energy dissipation, and enables use of conventional steel piping and pressure-vessel-containment technology and devices. This radiation-convection-conduction system can be viewed as a series of connected resistances wherein heat flow is equal in each element of a circuit.

In the crossectional view of the Hot Tubes™ radiation-convection-conduction system of FIG. 4, high-temperature inert working medium gas 280 is ducted in a carbon-carbon flow channel 200. Carbon-carbon flow channel 200 temperature will approach inert working medium gas temperature. At this high temperature, radiation is the principal heat transfer mechanism; therefore, the exterior surface of carbon-carbon flow channel 200 will emit a very high radiant-heat flux. A highly reflective radiation shield 210 presents an effective barrier to this radiation. Highly reflective radiation shield 210 is made, for example, of a stainless steel foil. Radiation shield 210 is perforated such that it does not result in a pressure differential. Carbon-carbon standoffs 220 support carbon-carbon flow channel 200 in a concentric relationship with respect to radiation shield 210 and metal-clad interior insulation 230. Highly reflective, metal-clad interior insulation 230 forms a low thermal conductivity liner inside steel casing 240. Metal-clad interior insulation 230 is made of, for example, ceramic fiber-reenforced insulation clad with polished stainless steel foil. The highly-reflective, metal-clad insulation 230 inhibits radiation from a low-emissivity surface of radiation shield 210. Thus, a double radiation thermal barrier is formed. Pressurized interwall inert gas 250 contained between interior insulation 230 and carbon-carbon flow channel 200 is of the same species as the inert working medium gas. Due to migration of the inert working medium gas through carbon-carbon, pressure of pressurized interwall-inert-gas 250 could equilibrate with pressure of inert working medium gas over a long period of time. A pressurizing sub-system could be used for approximately balancing the pressure of interwall inert gas 250 with inert working medium gas pressure could be used to accelerate stabilization of operating conditions. Interwall inert gas 250 enables radiation shield 210 and metal-clad interior insulation 230 to retain highly reflective interior and exterior surfaces. Metal-clad insulation 230 contains a low-conductivity insulation bonded to the reflective surface forming an additional thermal barrier to heat transfer, such that a conventional steel pipe utilized as a pressure vessel can operate at temperatures well within the long term creep limits of the material, for example from about 600° F. to about 1000° F. Thus, the use of conventional piping and connector devices is enabled for pressure containment equipment. Exterior insulation 260, for example, conventional fiberglass insulation with an aluminum foil outer wrap forms the outermost layer of the insulated piping structure.

FIG. 3 illustrates the shielding-cooling insulating system's structural cooling loop 170. The shielding-cooling-insulating system's structural cooling loop consists of preheater 135, i.e., air-cooled or water-cooled, a circulation pump 171, an inert working medium gas, an inert working medium gas source and pressure controls.

Structural cooling loop 170 transfers heat energy to the base system 111 via preheater 162. Alternatively, if energy to be dissipated in the structural cooling loop 170 is negligible in quantity, it could be dissipated in an air-cooled heat exchanger.

The inert working medium gas is injected into Hot Tubes™ shielding-cooling-insulating system high temperature piping 125 for direct contact with outer layers of carbon-carbon flow channel 200.

The present invention increases thermal efficiency of a power generation system by using high-temperature resistant materials to increase the difference between the maximum and minimum cycle temperatures. The high temperature materials include carbon-carbon for a high-temperature turbine expander rotor, carbon-carbon heat-shielding and metal foil radiation shielding for internal piping insulation, and ceramic fire tubes in the Brayton-cycle topping system. A shielding-cooling-insulating environment for ducting and containing high temperature and high pressure working fluids is provided. This shielding-cooling-insulating environment to prevent metal creep due to high temperature/high pressure inert gas ducting and containment and controls temperature distribution to allow use of a conventional steel structure for the topping system. Additionally, this shielding-cooling-insulating environment accommodates migration of the working fluid through carbon-carbon.

What is claimed:

1. A system for shielding an interior metal surface of a metal container from a hot fluid within the metal container wherein the hot fluid is at a temperature greater than a temperature limit of the metal, said system comprising:

a first insulating layer including metal clad insulation proximate said interior metal surface, said metal clad insulation including reflective metal cladding and low thermal conductivity insulation;

a second insulating layer including a perforated reflective metal shield spaced from said first insulating layer; and a third insulating layer spaced from said second insulating layer and including a composite which is structurally stable and substantially inert to said hot fluid at said temperature.

2. The system of claim 1, wherein said composite is made of carbon-carbon.

3. The system of claim 2, wherein the metal cladding comprises stainless steel foil.

4. The system of claim 2, wherein the hot fluid comprises a monatomic inert gas.

5. The system of claim 4, wherein the monatomic inert gas is selected from a group consisting of argon, helium and neon.

6. A system for shielding the interior metal surface of a steel container adapted to contain inert gas at a temperature beyond a temperature limit of the steel, said system comprising:

a first insulating layer including metal clad insulation proximate said interior metal surface, said metal clad insulation including stainless steel foil cladding and low thermal conductivity insulation ceramic fiber;

a second insulating layer comprising a perforated stainless steel foil metal shield spaced from said first layer; and a third insulating layer spaced from said second insulating layer and comprising a carbon-carbon composite which is structurally stable and substantially inert to said gas at said temperature.

7. The system of claim 6, wherein the gas is a monatomic inert gas.

* * * * *